United States Patent
Hildreth et al.

(10) Patent No.: US 10,665,019 B2
(45) Date of Patent: May 26, 2020

(54) SPATIAL RELATIONSHIPS FOR INTEGRATION OF VISUAL IMAGES OF PHYSICAL ENVIRONMENT INTO VIRTUAL REALITY

(71) Applicant: QUALCOMM Incorporated, San Diego, CA (US)

(72) Inventors: Evan Robert Hildreth, Thornhill (CA); Francis Bernard MacDougall, Milton (CA)

(73) Assignee: QUALCOMM Incorporated, San Diego, CA (US)

( * ) Notice: Subject to any disclaimer, the term of this patent is extended or adjusted under 35 U.S.C. 154(b) by 171 days.

(21) Appl. No.: 15/080,363

(22) Filed: Mar. 24, 2016

(65) Prior Publication Data

US 2017/0278304 A1    Sep. 28, 2017

(51) Int. Cl.
*G06T 19/00* (2011.01)
*G06F 3/0484* (2013.01)
(Continued)

(52) U.S. Cl.
CPC ........ *G06T 19/006* (2013.01); *G02B 27/0172* (2013.01); *G06F 3/011* (2013.01);
(Continued)

(58) Field of Classification Search
CPC ........ G02B 27/0172; G02B 2027/0138; G06F 3/017; G06F 3/0484; G06F 3/011; G06F 3/012; G06F 3/04815; G06T 19/006
See application file for complete search history.

(56) References Cited

U.S. PATENT DOCUMENTS

| 5,534,917 A | 7/1996 | MacDougall |
| 7,058,204 B2 | 6/2006 | Hildreth et al. |

(Continued)

FOREIGN PATENT DOCUMENTS

| CN | 102884490 A | 1/2013 |
| CN | 104536579 A | 4/2015 |

(Continued)

OTHER PUBLICATIONS

Bruder G., et al., "Enhancing Presence in Head-mounted Display Environments by Visual Body Feedback Using Head-mounted Cameras," International Conference on Cyber Worlds, IEEE, 2009, 8 pages.

(Continued)

*Primary Examiner* — Pinalben Patel
(74) *Attorney, Agent, or Firm* — Muncy, Geissler, Olds & Lowe, P.C.

(57) ABSTRACT

A method for use with a head-mounted display in a physical environment includes obtaining depth information of the physical environment and capturing a visual image of the physical environment. The method also includes determining a spatial relationship between a user of the head-mounted display and one or more physical objects included in the physical environment based on the depth information. The visual image is then segmented based on the spatial relationship to generate a segmented image that includes the one or more physical objects. The segmented image is then overlaid on a virtual image to display both the virtual image and the one or more physical objects on the head-mounted display.

44 Claims, 10 Drawing Sheets

(51) Int. Cl.
*G06F 3/01* (2006.01)
*G06F 3/0481* (2013.01)
*G02B 27/01* (2006.01)

(52) U.S. Cl.
CPC .............. *G06F 3/012* (2013.01); *G06F 3/017* (2013.01); *G06F 3/0484* (2013.01); *G06F 3/04815* (2013.01); *G02B 2027/0138* (2013.01)

(56) References Cited

U.S. PATENT DOCUMENTS

| | | | |
|---|---|---|---|
| 7,227,526 B2 | 6/2007 | Hildreth et al. | |
| 7,359,564 B2* | 4/2008 | Keam | G06K 9/2036 250/221 |
| 10,497,177 B1* | 12/2019 | Cote | G06T 19/003 |
| 2007/0083825 A1 | 4/2007 | Chaudhri et al. | |
| 2010/0182340 A1* | 7/2010 | Bachelder | G02B 27/017 345/633 |
| 2011/0302535 A1 | 12/2011 | Clerc et al. | |
| 2012/0212594 A1* | 8/2012 | Barnes | G06T 11/60 348/62 |
| 2013/0044912 A1* | 2/2013 | Kulkarni | G06K 9/00671 382/103 |
| 2014/0118255 A1* | 5/2014 | Billerbeck | G06F 3/017 345/158 |
| 2014/0184496 A1* | 7/2014 | Gribetz | G02B 27/017 345/156 |
| 2014/0204002 A1 | 7/2014 | Bennet et al. | |
| 2015/0097862 A1* | 4/2015 | Reisner-Kollmann | G06T 19/006 345/633 |
| 2015/0243079 A1 | 8/2015 | Cho et al. | |
| 2015/0257682 A1* | 9/2015 | Hansen | A61B 5/1128 382/103 |
| 2015/0262412 A1 | 9/2015 | Gruber et al. | |
| 2016/0025982 A1 | 1/2016 | Sutherland et al. | |
| 2016/0027215 A1 | 1/2016 | Burns et al. | |
| 2016/0210785 A1* | 7/2016 | Balachandreswaran | G02B 27/017 |
| 2016/0225164 A1* | 8/2016 | Tomlin | G06T 15/04 |
| 2017/0273639 A1* | 9/2017 | Iscoe | G06F 3/04815 |
| 2018/0224926 A1* | 8/2018 | Harviainen | G06F 3/0488 |

FOREIGN PATENT DOCUMENTS

| | | |
|---|---|---|
| EP | 2996017 A1 | 3/2016 |
| WO | 2015048906 A1 | 4/2015 |

OTHER PUBLICATIONS

Ferrari V., et al., "A 3-D Mixed-Reality System for Stereoscopic Visualization of Medical Dataset," IEEE Transactions on Biomedical Engineering, Nov. 2009, vol. 56, No. 11, pp. 2627-2633.

McGill M., et al., "A Dose of Reality: Overcoming Usability Challenges in VR Head-Mounted Displays", CHI 2015, Apr. 18, 2015, pp. 2143-2152.

International Search Report and Written Opinion—PCT/US2017/014554—ISA/EPO—dated Sep. 25, 2017.

Knyaz V.A., et al., "Approach to Accurate Photorealistic Model Generation for Complex 3D Objects", International Archives of Photogrammetry and Remote Sensing, vol. XXXIII, Part B5, Jul. 16, 2000 (Jul. 16, 2000), pp. 428-433, XP055405107, Amsterdam, Retrieved from the Internet: URL: https://www.researchgate.net/proffie/Vladimir_Knyaz/publication/228932696_Approach_to_Accurate_Photorealistic_Model_Generation_for_Complex_3D_Objects/links/0deec53319ce0008dd000000.pdf [retrieved on Sep. 8, 2017].

Olwal A., et al., "Senseshapes: Using Statistical Geometry for Object Selection in a Multi Modal Augmented Reality System", Proceedings / The Second IEEE and ACM International Symposium on Mixed and Augmented Reality: Oct. 7-10, 2003, Tokyo, Japan, IEEE Computer Society, Los Alamitos, California [U.A.], Oct. 7, 2003 (Oct. 7, 2003), pp. 300-301, XP010662838, DOI: 10.1109/ISMAR.2003.1240730, ISBN: 978-0-7695-2006-3.

Partial International Search Report and Written Opinion—PCT/US2017/014554—ISA/EPO dated May 15. 2017.

* cited by examiner

SPATIAL RELATIONSHIPS FOR INTEGRATION OF VISUAL IMAGES OF PHYSICAL ENVIRONMENT INTO VIRTUAL REALITY

FIELD OF DISCLOSURE

Aspects of the present disclosure relate generally to virtual reality and in particular to integration of visual images of a physical environment into a virtual image presented on a head-mounted display.

BACKGROUND

Virtual Reality (VR) is a burgeoning technology that provides users with immersive multimedia or computer-simulated environments. Such environments may simulate the user's physical presence in a fictional world or a world modeled after a real place. VR technology may present the user with graphics, audio, and other sensory enhancements to improve the user's experience within the virtual environment.

Some of today's VR technology still has challenges, however. For example, many VR headsets occlude the user's field of vision of the real word (i.e., physical environment). That is, in order to present a more immersive visual appearance to the user, VR headsets may completely, or mostly, occlude a user's view of everything other than the VR headsets' display. Thus, while wearing the VR headset and engaged in the VR simulation, a user is often prevented from visually sensing and interacting with their real-world surroundings. This lack of visual sensing of the real-world while wearing a VR headset may cause several difficulties and/or problems for the user. For example, the user may be prevented, or at least impeded, in their attempt to orient their hands on a computer keyboard. In another example, the user may be unable to reach for a desired object, such as a drink or phone. In yet another example, the user may not notice another person entering the room or coming within their vicinity. Even still, a user may not even be able to see a wall that they are about to walk into until it is too late.

Some conventional VR systems provide a tracking system that tracks a user's hands and then provides a representation of their hands (e.g., an avatar) within the VR simulation. However, such systems are typically limited to providing the user with a mechanism to interact with just virtual objects that exist in the VR simulation, and are of little help to the problems discussed above.

SUMMARY

In one aspect, a method for use with a head-mounted display in a physical environment includes obtaining depth information of the physical environment and capturing a visual image of the physical environment. The method also includes determining a spatial relationship between a user of the head-mounted display and one or more physical objects included in the physical environment based on the depth information. The visual image is then segmented based on the spatial relationship to generate a segmented image that includes the one or more physical objects. The segmented image is then overlaid on a virtual image to display both the virtual image and the one or more physical objects with the head-mounted display.

In another aspect, a head-mounted display includes means for capturing depth information of the physical environment and a visual camera for capturing a visual image of the physical environment. The head-mounted display also includes means for determining a spatial relationship between a user of the head-mounted display and the one or more physical objects included in the physical environment based on the depth information. Further included in the head-mounted display are means for segmenting the visual image based on the spatial relationship to generate a segmented image that includes the one or more physical objects and means for displaying a virtual image with the head-mounted display. The head-mounted display further includes means for overlaying the segmented image on the virtual image to display both the virtual image and the one or more physical objects captured by the visual camera.

Another aspect is directed to a head-mounted display. The head-mounted display includes a visual camera and a display. The head-mounted display also includes at least one processor and at least one memory coupled to the at least one processor. The at least one processor and the at least one memory being configured to direct the head-mounted display to: (i) obtain depth information of the physical environment, where the physical environment includes one or more physical objects; (ii) capture a visual image of the physical environment with the visual camera; (iii) determine a spatial relationship between a user of the head-mounted display and the one or more physical objects included in the physical environment based on the depth information; (iv) segment the visual image based on the spatial relationship to generate a segmented image that includes the one or more physical objects; (v) display a virtual image with the display; and (vi) overlay the segmented image on the virtual image to display both the virtual image and the one or more physical objects captured by the visual camera.

In yet another aspect, a non-transitory computer-readable medium includes program code stored thereon. The program code includes instructions which when executed cause a head-mounted display to: (i) obtain depth information of a physical environment, where the physical environment includes one or more physical objects; (ii) capture a visual image of the physical environment with a visual camera; (iii) determine a spatial relationship between a user of a head-mounted display and the one or more physical objects included in the physical environment based on the depth information; (iv) segment the visual image based on the spatial relationship to generate a segmented image that includes the one or more physical objects; (v) display a virtual image with the head-mounted display; and (vi) overlay the segmented image on the virtual image to display both the virtual image and the one or more physical objects captured by the visual camera.

This Summary is submitted with the understanding that it will not be used to interpret or limit the scope or meaning of the claims. This Summary is not intended to identify key features or essential features of the claimed subject matter, nor is it intended to be used as an aid in determining the scope of the claimed subject matter.

BRIEF DESCRIPTION OF THE DRAWINGS

The Detailed Description references the accompanying figures. In the figures, the left-most digit(s) of a reference number identifies the figure in which the reference number first appears. The same numbers are used throughout the drawings to reference like features and components.

DETAILED DESCRIPTION

Figure 1:
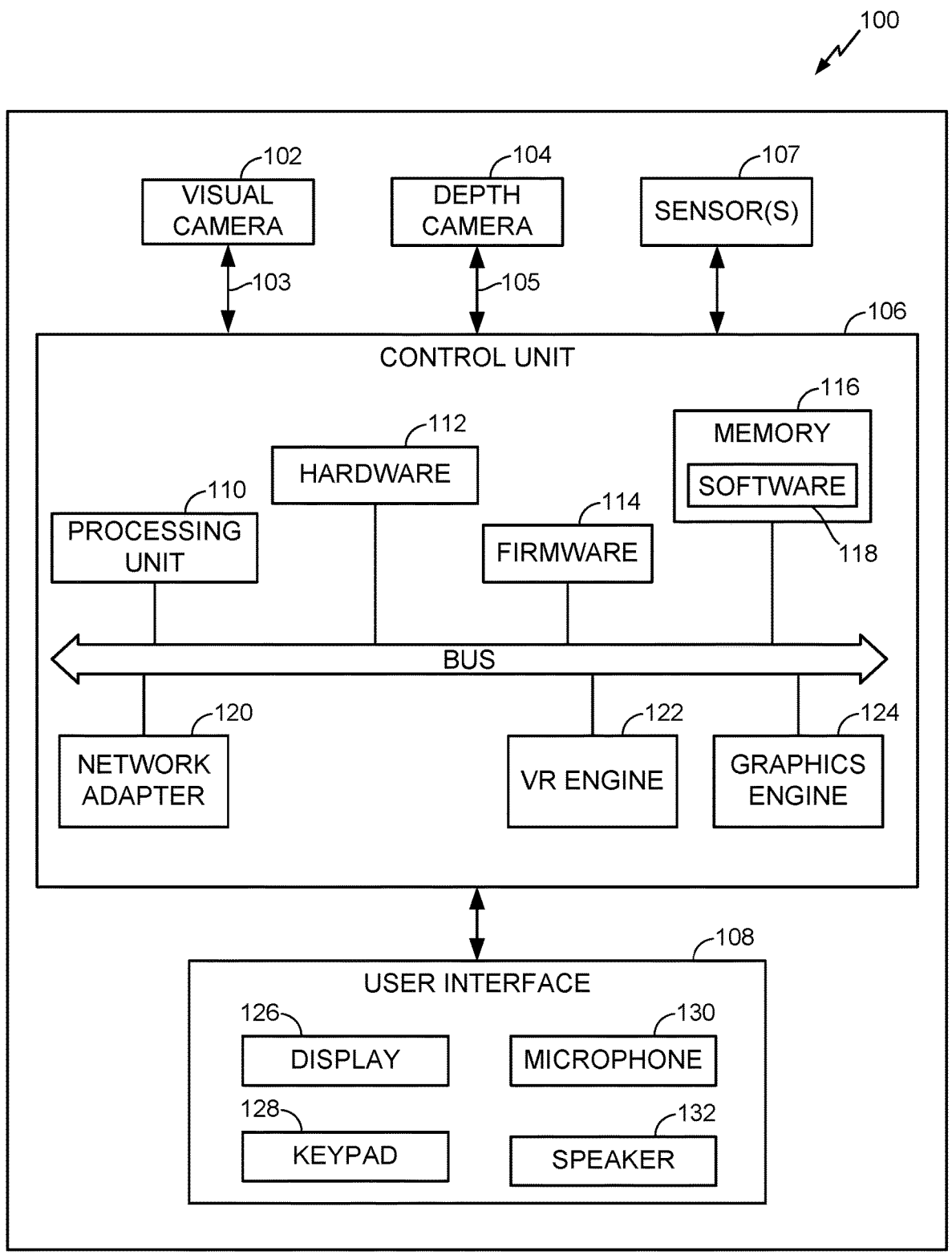
FIG. 1 is a functional block diagram illustrating a head-mounted display capable of performing the processes discussed herein.

FIG. 1 is a functional block diagram illustrating a head-mounted display (HMD) 100 capable of performing the processes discussed herein. In one example HMD 100 is a user device capable integrating visual images of a physical environment into a virtual reality image, such as process 400, described infra. In general, control unit 106 is coupled to receive visual images 103 of a physical environment from visual camera 102. Control unit 106 is configured to then integrate the visual images 103 into a virtual image generated by VR engine 122. The virtual image is then displayed to a user by way of display 126. In one implementation, the display 126, the visual camera 102, depth camera 104, control unit 106, sensors 105, and/or user interface 108 are integrated into a single unit wearable by a user of the HMD 100. In another implementation, the control unit 106 is separate from the HMD 100. That is, control unit 106 may be implemented by a computer, telephone, tablet computer, "phablet (phone+tablet)" computer, smart phone, laptop and desktop computers, and the like that is coupled to the HMD 100 by way of a wired or wireless connection. As such, control unit 106 may include an application programming interface (API) or other interface for communicating with the HMD 100. Regardless of whether the control unit 106 is integrated with the HMD 100 or implemented separately, in certain aspects, the visual camera 102, optional depth camera 104, and the sensors 107 are integrated with the display 126 within HMD 100, as will be discussed in more detail below.

In one implementation, visual camera 102 is a color camera, such as an RGB camera. Visual camera 102 is configured to capture visual images 103 of a real-world scene (i.e., a physical environment) and to provide the visual images 103 to control unit 106. Visual camera 102 may include a single monocular camera, a stereo camera, and/or an omnidirectional camera. In one aspect, visual camera 102 is calibrated such that the camera parameters (e.g., focal length, displacement of the optic center, radial distortion, tangential distortion, etc.) are known. Furthermore, as discussed above, visual camera 102 is integrated with the HMD 100. Visual camera 102 may be integrated with HMD 100 such that a change in orientation of the HMD 100 by a user (i.e., wearer) results in the same, or similar, change in orientation of the visual camera 102.

HMD 100 also includes an optional depth camera 104. Depth camera 104 is configured to provide depth information 105 to the control unit 106. In some aspects, the depth camera 104 is a ranging camera, such as a time-of-flight (ToF) camera. In other aspects, the depth camera 104 is a structured-light camera or a stereo camera. The depth information 105 may include a 3-dimensional (3D) point cloud of the physical environment. As such, the depth camera 104 may be integrated with HMD 100 such that a change in orientation of the HMD 100 by a user (i.e., wearer) results in the same, or similar, change in orientation of the depth camera 104. However, as mentioned above, depth camera 104 may be optional. That is, in some implementations depth information 105 may be derived from the visual images 103 themselves through use of one or more model-based tracking algorithms. For example, Simultaneous Localization And Mapping (SLAM) algorithms may be utilized by control unit 106 to generate the depth information 105 based on one or more visual images 103. SLAM algorithms may reconstruct 3D points from incoming image sequences captured by visual camera 102 to build a 3D map of a physical environment. Other known algorithms to generate depth information 105 from visual images 103 may be implemented in accordance with the teachings herein.

Also shown in FIG. 1 is a sensor 107. In one aspect, sensor 107 includes a motion sensor to provide movement and/or orientation information which is independent of motion data that may be derived from visual images 103 and/or depth information 105. By way of example, the sensor 107 may include an accelerometer (e.g., a MEMS device), a gyroscope, a geomagnetic sensor (e.g., a compass), an altimeter (e.g., a barometric pressure altimeter), and/or any other type of movement detection sensor. Moreover, the sensor 107 may include a plurality of different types of devices and combine their outputs in order to provide motion information. For example, the sensor 107 may use a combination of a multi-axis accelerometer and orientation sensors to provide the ability to compute positions in 2-D and/or 3-D coordinate systems. As with the visual camera 102, the sensor 107 may be integrated with HMD 100 such that a change in orientation measured by sensor 107 is representative of a change in orientation of the HMD 100 by a user (i.e., wearer).

HMD 100 also includes a user interface 108 that includes the display 126 capable of displaying the VR scene generated by the HMD 100. As mentioned above, the VR scene may include real-world (i.e., physical) objects of a physical environment that are captured by visual camera 102. User interface 1008 may also include an optional keypad 128 or other input device through which the user can input information into the HMD 100. User interface 108 may also include a microphone 130 and speaker 132.

Control unit 106 is connected to and communicates with the visual camera 102, depth camera 104, sensor 107, and user interface 108. The control unit 106 accepts and processes visual images 103 received from the visual camera 102. The control unit 106 also accepts and processes data received from sensor 107 for the tracking of a pose of HMD 100. Control unit 106 may be provided by a processing unit 110 and associated memory 116, hardware 112, firmware 114, software 118, and graphics engine 124.

Control unit 106 may further include a virtual reality (VR) engine 122. VR engine 122 may be configured to perform one or more procedures related to the integration of visual images of a physical environment into a virtual reality image, such as will be described below with reference to process 400 of FIG. 4. The visual images 103 captured by visual camera 102 as well as the depth information 105 generated by depth camera 104 and the data generated by sensor 107 may be provided to the VR engine 122. The VR engine 122 may then render or otherwise generate visual elements of the VR scene in an image on the HMD 100.

Processing unit 110 and VR engine 122 are illustrated separately for clarity, but may be a single unit and/or implemented in the processing unit 110 based on instructions in the software 118 which is run in the processing unit 110. Processing unit 110, as well as the VR engine 122 can, but need not necessarily include, one or more microprocessors, embedded processors, controllers, application specific integrated circuits (ASICs), digital signal processors (DSPs), and the like. The terms processor and processing unit describes the functions implemented by the system rather than specific hardware. Moreover, as used herein the term "memory" refers to any type of computer storage medium, including long term, short term, or other memory associated with HMD 100, and is not to be limited to any particular type of memory or number of memories, or type of media upon which memory is stored.

The processes described herein may be implemented by various means depending upon the application. For example, these processes may be implemented in hardware 112, firmware 114, a combination of hardware 112 and software 118, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or hardware and software combination implementation, the processes may be implemented with modules (e.g., procedures, functions, and so on) that perform the functions described herein. Any computer-readable medium tangibly embodying instructions may be used in implementing the processes described herein. For example, program code may be stored in memory 116 and executed by the processing unit 110. Memory may be implemented within or external to the processing unit 110.

If implemented in firmware and/or a hardware/software combination, the functions may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, Flash Memory, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Figure 2:
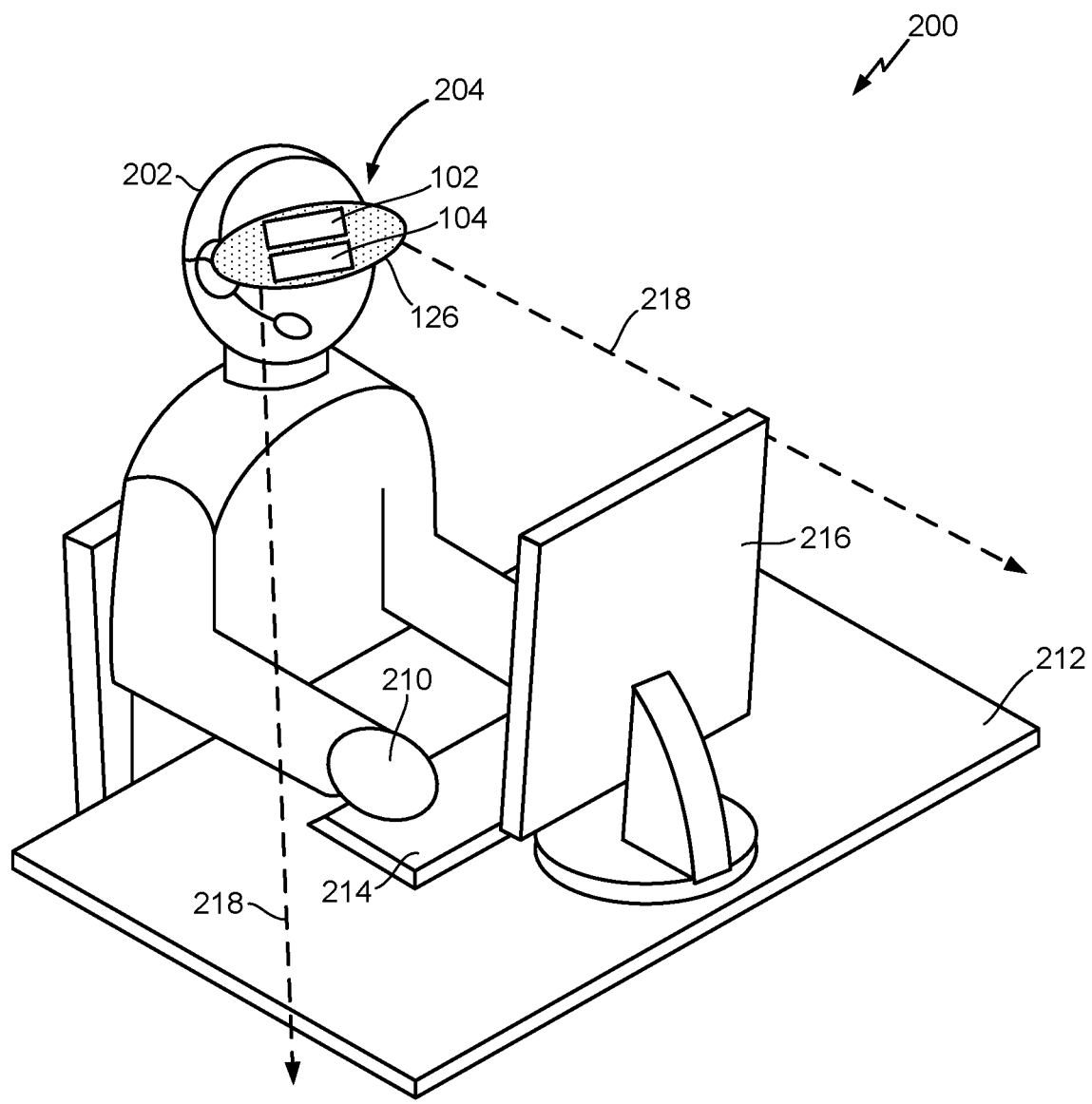
FIG. 2 illustrates a user of a head-mounted display in a physical environment according to one or more implementations of the technology described herein.

FIG. 2 illustrates a user 202 of a head-mounted display (HMD) 204 in a physical environment 200 according to one or more implementations of the technology described herein. In one example, HMD 204 may be implemented as HMD 100 of FIG. 1. The illustrated example of HMD 204 is shown as including display 126, visual camera 102, and depth camera 104. However, as mentioned above, depth camera 104 may be optional and HMD 204 may further include a motion sensor (e.g., sensor 107) for providing orientation measurements of the HMD 204 as the user 202 moves within physical environment 200.

As shown in FIG. 2, user 202 is located within a physical environment 200 that includes one or more physical objects. These physical objects may include a table/desk 212, a keyboard 214, and a monitor 216. However, any physical object may be included in the physical environment 200 such as a wall, door, a drink, a phone, another person, etc. As mentioned above, the display 126 of HMD 204 may occlude, at least, a portion of the user 202's field of vision of the physical environment 200. That is, when not wearing the HMD 204, the user 202 may have an unobstructed field of view 218 of the physical environment 200. However, when wearing the HMD 204 some, or all, of the field of view 218 is blocked by the HMD 204, itself. Thus, in accordance with the teachings herein, HMD 204 is configured to integrate visual images of one or more of the physical objects (e.g., 212, 214, 216) into the virtual image being displayed to the user 202 to allow the user 202 to sense and/or interact with the physical environment without having to remove the HMD 204 and/or interrupt the VR simulation.

In one aspect, the HMD 204 includes the visual camera 102 integrated with the display 126 such that a field of view of the physical environment 200 that is captured by the visual camera 102 is the user 202's obstructed field of view 218. That is, the field of view of the visual camera 102 may be the same or similar to the field of view of the user 202 if the user 202 were not wearing the HMD 204.

The HMD 204 may also include a depth camera 104 integrated with the head-mounted display 126 to capture depth information (e.g., point cloud). A field of view of the depth camera 104 may be the same or similar to that of visual camera 102 (e.g., field of view 218).

In operation, HMD 204 is configured to segment a visual image of the physical environment 200 that is captured by visual camera 102 based on the depth information captured by depth camera 104. However, as mentioned above, the depth camera 104 may be optional. Thus, in some implementations depth information 105 may be derived from the visual images 103 themselves through use of one or more model-based tracking algorithms (e.g., SLAM algorithms). As will be described in more detail below, the segmentation of the visual image may generate a segmented image that includes one or more of the physical objects present in the physical environment 200. For example, the segmented image may include a hand 210 of the user, by itself, the desk 212, by itself, the keyboard 214, by itself, the monitor 216, by itself, or any combination thereof. The HMD 204 then overlays the segmented image onto a virtual image being displayed to the user 202 via the display 126, thus integrating visual images of the physical environment 200 into VR.

Accordingly, user 202 may then be able to sense and/or interact with the physical environment 200 without having to remove the HMD 204 and/or without having to interrupt the VR simulation (e.g., game-play). For example, integration of the visual images of the physical environment 200 into VR may allow the user 202 to correctly orient their hands 210 on the keyboard 214, reach for an object (i.e., a drink) sitting on the desk/table 212, sense another person entering the physical environment or trying to get user 202's attention, and/or sense a physical obstruction they are about to contact (e.g., a wall they are about to walk into). According to some aspects, HMD 204 need not classify or comprehend what the physical object is, thereby supporting the presentation of arbitrary physical objects into the VR simulation.

Figure 3:
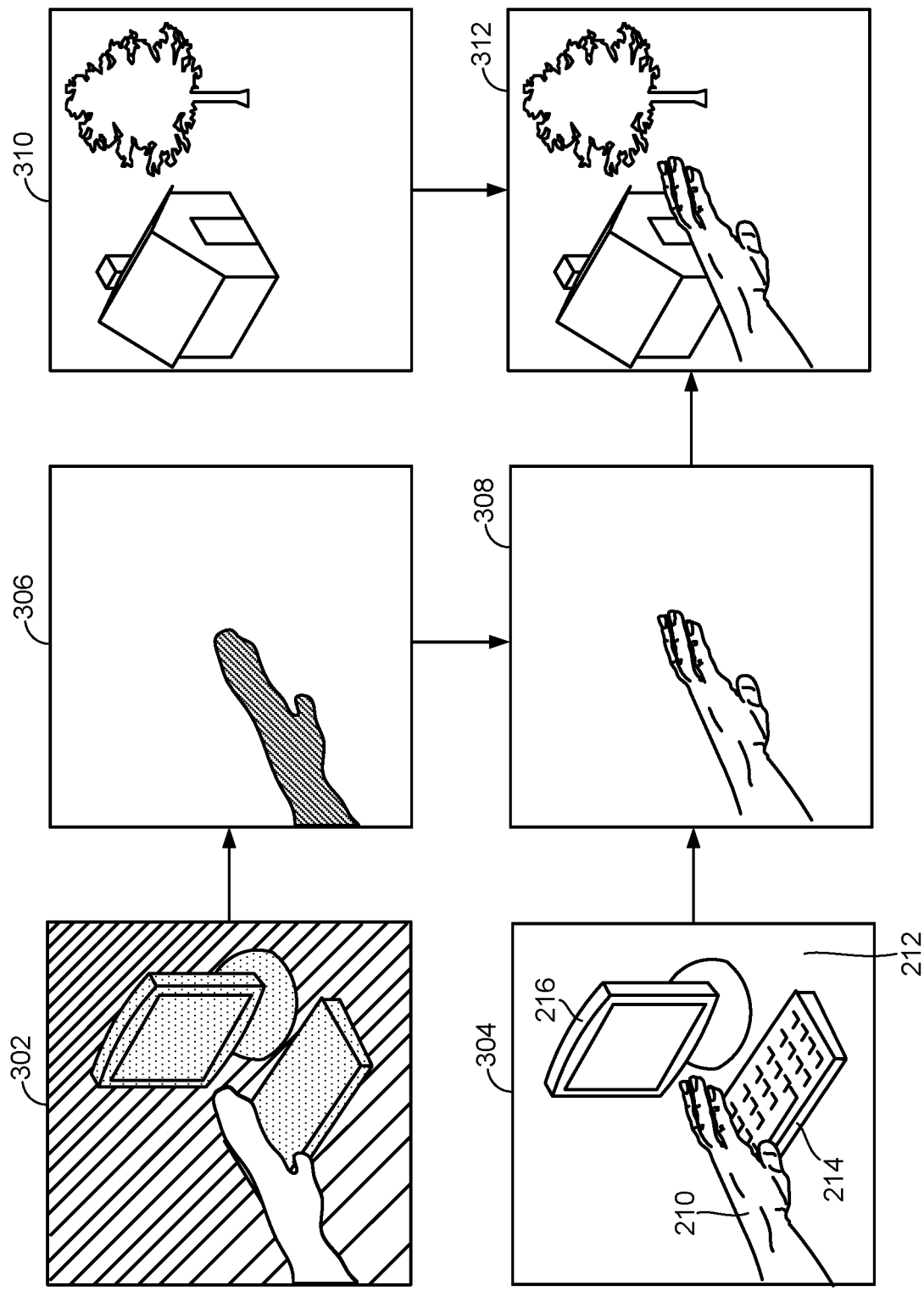
FIG. 3 illustrates a process of integrating a visual image of a user hand into a virtual image based on depth information according to one or more implementations of the technology described herein.

FIG. 3 illustrates a process of integrating a visual image of a user hand into a virtual image based on depth information according to one or more implementations of the technology described herein. A depth image 302 of the physical environment 200 may be captured by a depth camera 104 of HMD 204. In one aspect, depth camera 104 and/or VR engine 122 may be configured to generate depth information 105, such as a 3D point cloud of the physical environment 200 based on the depth image 302. However, in other examples the depth information 105 may be derived by way of one or more algorithms applied to the visual images 103 generated by visual camera 102. For example, FIG. 3 illustrates a visual image 304 of the physical environment 200 that is captured by the visual camera 102. As shown, visual image 304 includes image data of a hand 210 of user 202, the desk/table 212, the keyboard 214, and the monitor 216. The VR engine 122 may be configured to segment the visual image 304 based on the depth image 302 (i.e., depth information), and then classify portions of the visual image 304 as foreground objects based on depth information included in the depth image 302. Although VR engine 122 is configured to classify portions of the visual image (e.g., portions corresponding to physical objects) as foreground objects, VR engine 122 may complete this foreground classification without classifying or comprehending what the physical object is. Thus, visual image 304 may include arbitrary physical objects that the VR engine 122 has no a priori knowledge about. In the example of FIG. 3, the hand 210 is classified by the VR engine 122 as a foreground object within the depth image 302, from which an alpha mask 306 is produced. VR engine 122 then applies the alpha mask 306 to the visual image 304 to generate a segmented image 308. As shown, segmented image 308 includes image data of only the hand 210. Thus, the hand has been segmented from other physical objects included in the visual image 304.

The VR engine 122 also generates a virtual image 310 that is displayed to the user 202 by way of the display 126. The virtual image 310 may be part of a VR simulation (e.g., a game) in which the user 202 is currently engaged. The VR engine 122 then overlays the segmented image 308 onto the virtual image 310 to present a combined image 312 to the user 202 via display 126. Thus, the combined image 312 includes both the virtual image 310 and a physical object (e.g., hand 210) captured by the visual camera 102. In one aspect, the VR engine 122 may adjust the segmented image 308 according to virtual scene lighting to create an appearance of the hand 210 that is more consistent with the virtual image 310 within the combined image 312, thereby increasing a sense of immersion felt by the user 202. By way of example, adjusting the segmented image 308 according to the virtual scene lighting may be implemented by the VR engine 122 when applying the alpha mask 306 to the visual image 304. In this example, the VR engine 122 may generate a 3D mesh of the detected foreground object (e.g., hand 210) based on a 3D point cloud. A portion of the visual image 304 corresponding to the hand 210 is then mapped onto the 3D mesh to generate the segmented image 308.

Depending on the VR simulation, the depth information provided by depth image 302 may be utilized such that the physical object (e.g., hand 210) may be occluded by close virtual objects in the virtual image 310. For example, VR engine 122 may be configured to compare a z-buffer of the rendered VR scene with the depth information provided by depth image 302 to determine whether one or more virtual objects should be presented in front of (i.e., occlude) the hand 210 in combined image 312.

Figure 4:
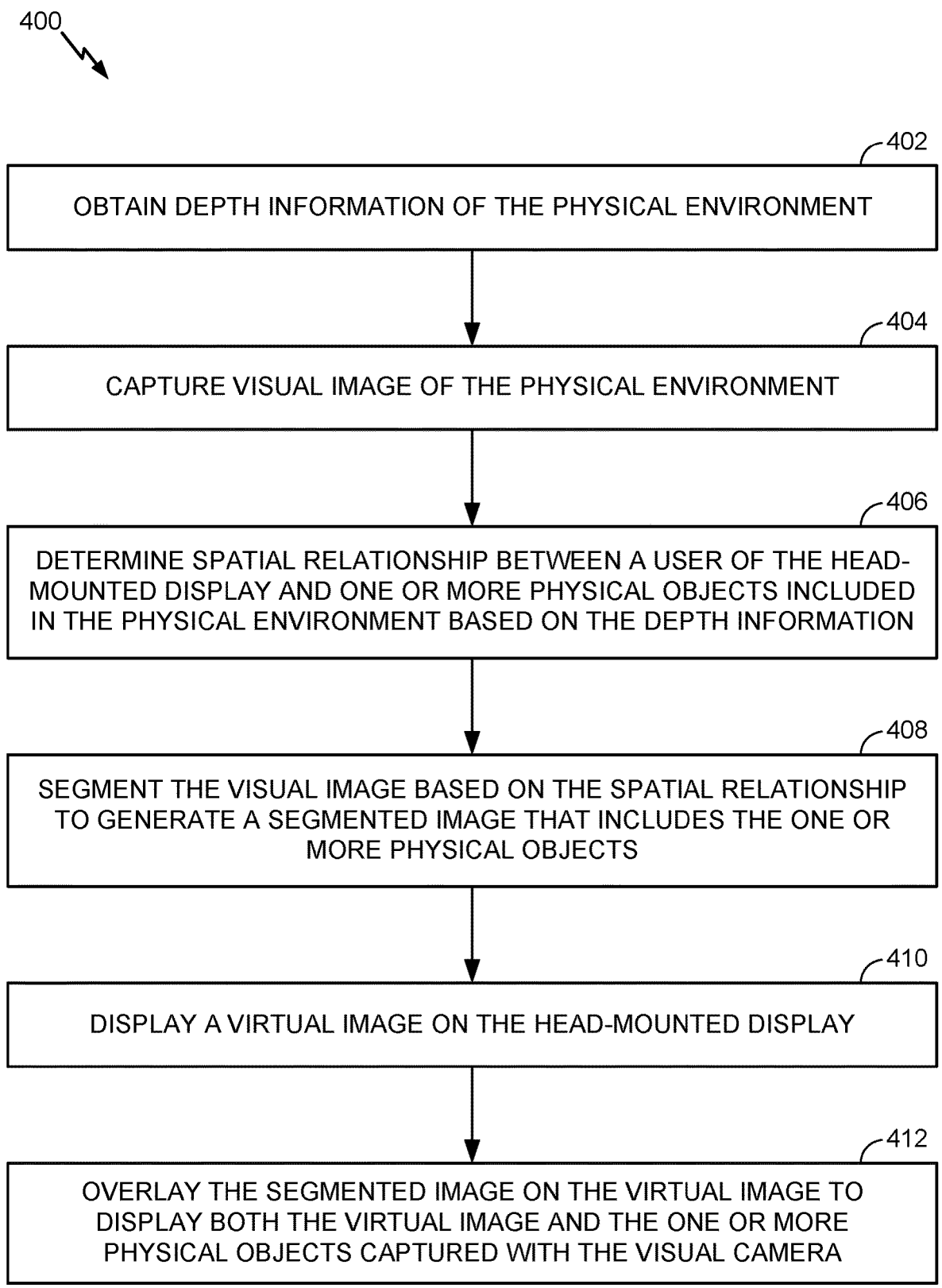
FIG. 4 is a flowchart illustrating a process of utilizing spatial relationships for the integration of visual images of a physical environment into virtual reality according to one or more implementations of the technology described herein.

As discussed above, in addition to just being able to view their own hands, a user 202 may desire to be able to sense and/or interact with one or more other physical objects in the physical environment 200 without having to remove the HMD 204 and/or without interrupting the VR simulation. Accordingly, FIG. 4 is a flowchart illustrating a process 400 of utilizing spatial relationships for the integration of visual images of a physical environment into virtual reality according to one or more implementations of the technology described herein. Process 400 is one possible process performed by HMD 100 of FIG. 1 and/or HMD 204 of FIG. 2.

In a process block 402, depth information 105 of the physical environment 200 is captured. As mentioned above, depth information 105 may be captured by a depth camera 104 and/or captured by applying one or more model-based algorithms to one or more visual images captured by visual camera 102. The depth information 105 may include a 3D point cloud of the physical environment 200.

In a process block 404, the visual camera 102 captures a visual image 103 of the physical environment 200. The visual image 103 may be a color (e.g., RGB) image or it may be a grayscale image. Next, in process block 406, VR engine 122 determines a spatial relationship between a user of the HMD (e.g., user 202 of HMD 204) and one or more physical objects (e.g., desk/table 212, keyboard 214, and monitor 216) included in the physical environment 200 based on the depth information 105. As will be discussed in more detail below, determining the spatial relationship may be based, in part, on whether user 202 is touching a physical object, a distance between the user 202 and the physical object, a hand gesture of the user 202, and/or one or more past models of the physical environment 200.

In process block 408, VR engine 122 segments the visual image 103 based on the spatial relationship to generate a segmented image that includes the one or more physical objects. In one example, segmenting the visual image 103 includes generating a 3D mesh of the one or more physical objects based on a 3D point cloud. A portion of the visual image 103 corresponding to the one or more physical objects is then mapped onto the 3D mesh to generate the segmented image. Next, in a process block 410, the VR engine 122 presents/generates a virtual image as part of a VR simulation for display on the display 126. In process block 412, the VR engine 122 overlays the segmented image on the virtual image to display both the virtual image and the one or more physical objects that were captured by the visual camera 102.

Figure 5:
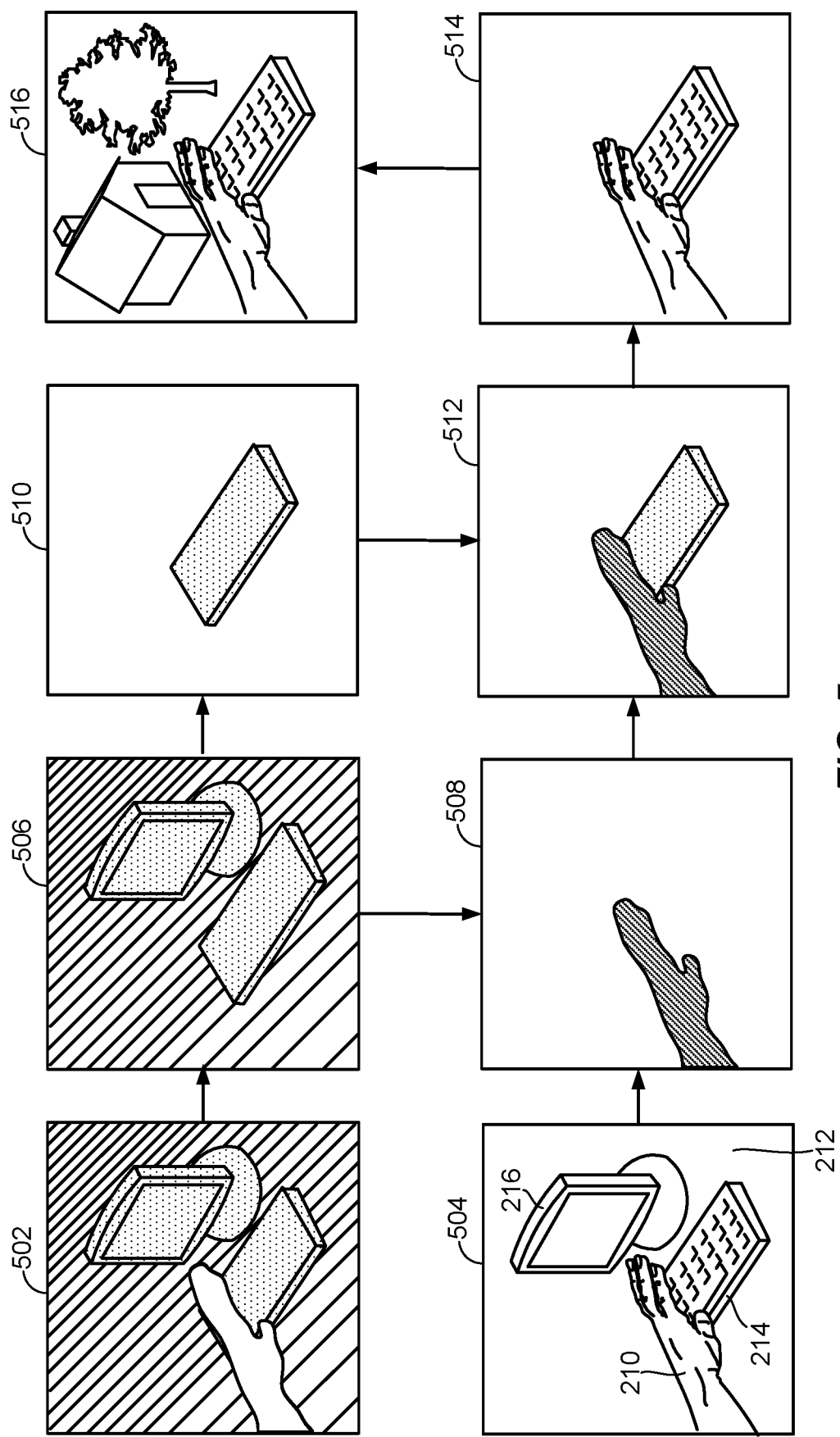
FIG. 5 illustrates a process of integrating a visual image of a physical object into a virtual image based on a spatial relationship between a user and the physical object according to one or more implementations of the technology described herein.

FIG. 5 illustrates a process of integrating a visual image of a physical object into a virtual image based on a spatial relationship between a user and the physical object according to one or more implementations of the technology described herein.

A depth image 502 of the physical environment 200 is captured by a depth camera 104 of HMD 204. FIG. 5 also illustrates a visual image 504 of the physical environment 200 that is captured by the visual camera 102. As shown, visual image 504 includes image data of a hand 210 of user 202, the desk/table 212, the keyboard 214, and the monitor 216. The VR engine 122 may be configured to transform the depth image 502 according to a position and orientation of the HMD 204 determined by, for example, sensor 107. In another example, VR engine 122 may transform the depth image 502 by a registration process, where the depth image 502 is compared to a past depth image to determine the transformation (with or without the aid of sensor 107). The transformed depth image 502 is then combined with past depth image 506 in order to identify static objects as background. For example, comparing the depth image 502 with past depth image 506 reveals that the desk/table 212, the keyboard 214, and the monitor 216 are all static objects and thus are classified as background, whereas hand 210 is classified as foreground.

The VR engine 122 may then segment the visual image 504 by comparing the depth image 502 with the past depth image 506 to generate a foreground alpha mask 508. Next, the VR engine 122 identifies background objects touching or near the identified foreground object. For example, VR engine 122 may identify the keyboard 214 (i.e., background object) as near or touching the hand 210 (foreground object) and thus, VR engine may segment the visual image 504 to also generate a background alpha mask 510 that includes only the keyboard 214. In one example, segmenting the visual image 504 to generate the background alpha mask 510 includes expanding the selected background objects based on characteristics of the background object, such as surface structure and/or visual appearance (e.g., color and/or texture), to segment an entire background object. Thus, even though the hand 210 may only be touching or near a portion of the keyboard 214, a background alpha mask 510 may be generated that corresponds to the entire keyboard 214. In some implementations, relatively large background objects (e.g., walls) may be segmented in their entirety. However, in other implementations, relatively large background objects (e.g., walls) may be segmented only in part, where only a portion of the large background object is segmented. For example, VR engine 122 may be configured to segment only a portion of a large background object (e.g., walls) that are within a threshold distance of a point on the object nearest to the user. By way of example, VR engine 122 may recognize that user 202 touches keyboard 214 and thus segments the entire keyboard 214 such that the entire keyboard 214 appears in the combined image 516. However, when VR engine 122 recognizes that the user 202 is touching the desk/table 212, only parts of the desk/table 212 that are within reach of the user 202 may appear in the combined image 516 so as reduce the occlusion of the virtual image.

The VR engine 122 then combines the foreground alpha mask 508 with the background alpha mask 510 to generate a combined alpha mask 512, which is then applied to the visual image 504 to generate a segmented image 514. As shown in FIG. 5, the segmented image 514 includes one or more physical objects (i.e., keyboard 214) as well as the hand 210, captured by the visual camera 102.

The VR engine 122 then overlays the segmented image 514 onto a virtual image to display a combined image 516 to the user 202 via display 126. Thus, the combined image 516 includes the virtual image as well as the hand 210 and a physical object (e.g., hand 210) captured by the visual camera 102. In one aspect, the VR engine 122 may adjust the segmented image 514 according to virtual scene lighting to create an appearance of the hand 210 that is more consistent with the virtual image within the combined image 516. In one example, VR engine 122 may adjust the segmented image 514 by generating a 3D mesh of the detected foreground object (e.g., hand 210) and the detected background object (e.g., keyboard 214) based on a 3D point cloud. Portions of the visual image 504 corresponding to the hand 210 and the keyboard 214 are then mapped onto the 3D mesh to generate the (adjusted) segmented image 514.

In some implementations, the VR engine 122 may adjust a transparency of the user hand 210 and/or keyboard 214 when overlaying the segmented image 514 onto the virtual image, such that the virtual image is not fully occluded by the segmented image 514. That is, the transparency of the segmented image 514 may be adjusted such that the physical objects are sufficiently visible for the user's needs (e.g., allows user to correctly orient hands on the keyboard), yet do not significantly interfere with the VR simulation (e.g., do not significantly occlude gameplay). In one aspect, the VR engine 122 may increase the transparency of the one or more physical objects included in the segmented image 514 over a period of time until the one or more physical objects are fully transparent. By way of example, the transparency of the keyboard 214 may be increased over a period of time to allow user 202 to orient their hands over the keyboard 214 before keyboard 214 fades out from view of the combined image 516. In some implementations, the transparency of the background objects may be controlled independently of the transparency of the foreground objects. For example, the VR engine 122 may adjust a transparency of a background object when combining the foreground alpha mask 508 with the background alpha mask 510, such that the background object (i.e., keyboard 214) is partially transparent while the foreground object (i.e., hand 210) if fully non-transparent. As discussed above, for relatively large background objects, the VR engine 122 may segment only those portions of the physical object that are within a threshold distance of a point on the object nearest to the user. Thus, when generating the background alpha mask 510, the VR engine 122 may adjust the transparency of the background object to be proportional to the distance from that point on the physical object, such that portions of the physical object that are farther from the user are more transparent than portions of the physical object that are nearer to the user.

As mentioned above, determining a spatial relationship between a user and the one or more physical objects in a physical environment may be based on whether the user is touching and/or near a physical object. Thus, VR engine 122 of HMD 100 may be configured to determine a distance between a user and the one or more physical objects in the physical environment 200, where the one or more physical objects are only included in the segmented image (e.g., 516) if the distance is less than a threshold. The value of the threshold may be selected such that the segmented image includes the one or more physical objects if the user is touching the one or more physical object. The value of the threshold may also be selected such that the segmented image includes the one or more physical objects if the user is at least near the one or more physical objects. Accordingly, FIG. 6 illustrates an example implementation of determining a spatial relationship between a user and a physical object based on distance according to one or more implementations of the technology described herein.

Figure 6:
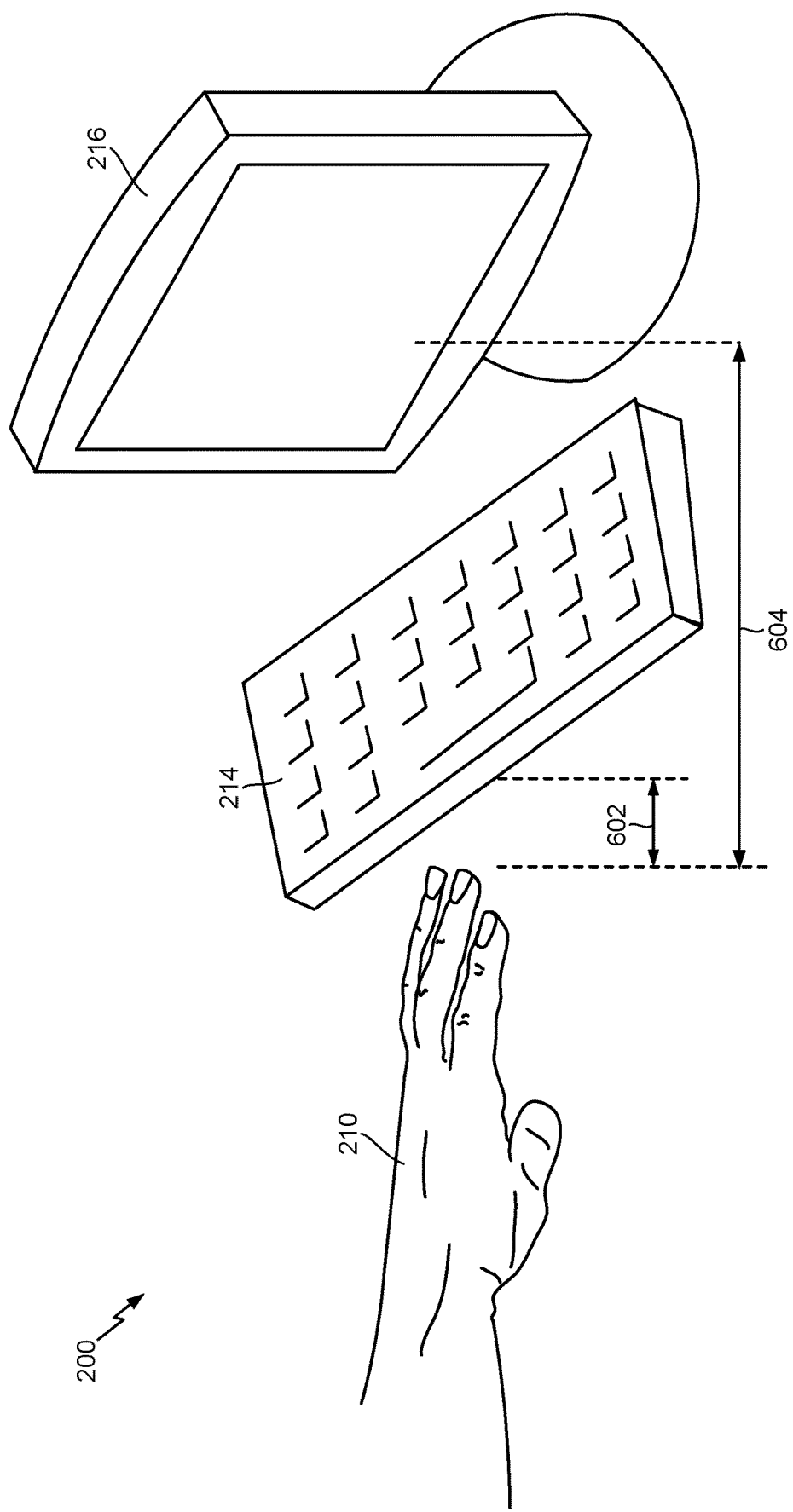
FIG. 6 illustrates an example implementation of determining a spatial relationship between a user and a physical object based on distance according to one or more implementations of the technology described herein.

FIG. 6 illustrates a hand 210 of user 202 and one or more physical objects (keyboard 214 and monitor 216) located in the physical environment 200. Accordingly, HMD 100 may be configured to determine a distance between the user and the one or more physical objects by determining distances 602, 604 between hand 210 and physical objects 214, 216, respectively. That is, the illustrated example includes determining a spatial relationship between the user and a physical object based on a distance between a hand of the user and the physical object. However, other examples may include determining the distance between other aspects of the user and the physical objects. For example, the distance may be based on a distance from a user's body (e.g., torso) to the physical object, the distance from a user's foot to the physical object, and/or the distance from a user's head to the physical object. Furthermore, determining the distance between the user and the physical objects need not include utilizing physical attributes of the user themselves, but instead of a user-controlled indicator. For example, the user may control (e.g., by holding in their hand) a stylus, pointer, tag, or other marker, where the distance determined is the distance between the user-controlled indicator and the physical object. In some implementations, the distance between the user and the physical object may be determined based on data from one or more sensors and/or cameras included in the HMD 100. For example, HMD 100 may determine the distance between the user and one or more physical objects based on one or more of visual images 103, depth information 105, and/or data provided by sensor 107.

Furthermore, in some examples, the distances 602 and 604 illustrated in FIG. 6 may be the distance to a point on a surface, edge, or border of the objects 214 and 216, respectively. However, in other examples, the distances 602 and 604 may be a distance to a position representative of the entire respective object (e.g., a reference position, such as center, corner, etc.). By way of example, referring back to process 400, in process block 406 the visual image has not yet been segmented, and therefore a position representative of the entire physical object may not yet be known. Process block 406 may then select seed points of a point cloud that are within a certain distance from the user or within a spatial area. Process block 408 may then include segmenting the one or more of the physical objects based upon the selected seed points, where those seed points are used to grow the physical object until its boundary is detected (e.g., based on color, texture, and/or geometry uniformity). Once the boundary of the physical object is determined, VR engine 122 may then determine a position representative of the entire physical object in order to decide whether the object is within the threshold distance of the user or within a defined spatial area (discussed below).

As shown in FIG. 6, the hand is a first distance 602 from keyboard 214 and a second greater distance 604 from monitor 216. The first distance 602 and the second distance 604 may each be compared with a threshold to determine whether to include the respective physical objects in the segmented image. For example, the value of the threshold may also be selected such that the segmented image includes the one or more physical objects if the hand 210 is at least near the one or more physical objects. Accordingly, the distance 602 is less than the threshold such that keyboard 214 is included in the segmented image, whereas distance 604 is not less than the threshold and thus monitor 216 is not included in the segmented image.

In another example, the value of the threshold may be selected such that the segmented image includes the one or more physical objects only if the user is touching the one or more physical objects. That is, the value of the threshold may be zero (or close to zero). Accordingly, distances 602 and 604 indicate that the hand 210 is touching neither the keyboard 214 nor the monitor 216 and thus, neither physical object may be included in the segmented image.

In some aspects, the distance between the user and the physical objects may be used to adjust a transparency of the physical objects displayed on the display 126 of HMD 100. That is, the VR engine 122 may be configured to adjust the transparency of the one or more physical objected included in the segmented image based on a distance between the user and the one or more physical objects. In one implementation, the transparency of a physical object may be set based on an initial distance between the user and the physical object and then the transparency may be decreased (making the physical object more visible) as the distance decreases. For example, referring to FIG. 6, the transparency of keyboard 214 may be initially set based on the distance 602, such that keyboard 214 is at least partially transparent (e.g., partially transparent in the combined image 516 of FIG. 5). Then, as the hand 210 moves towards the keyboard 214, thereby decreasing the distance 602, the transparency may be decreased making the keyboard 214 more and more visible the closer hand 210 gets to keyboard 214. In one implementation, the transparency of the keyboard 214 may be decreased proportionally to a decrease in the distance 602.

In some implementations, one or more physical objects may be integrated into VR scene displayed by the display 126 of HMD 100 based on a hand gesture or hand pose of the user. That is, the spatial relationship between the user and the one or more physical objects may be determined, in part, by recognizing a hand gesture of a hand of the user to identify the one or more physical objects to include in the segmented image. In some examples, a head-mounted display (e.g., HMD 100) generates a spatial area within a 3D point cloud and in proximity to the hand of the user in response to recognizing the hand gesture. The segmented image may then only include those physical objects that are located at least partially within the spatial area.

Figure 7:
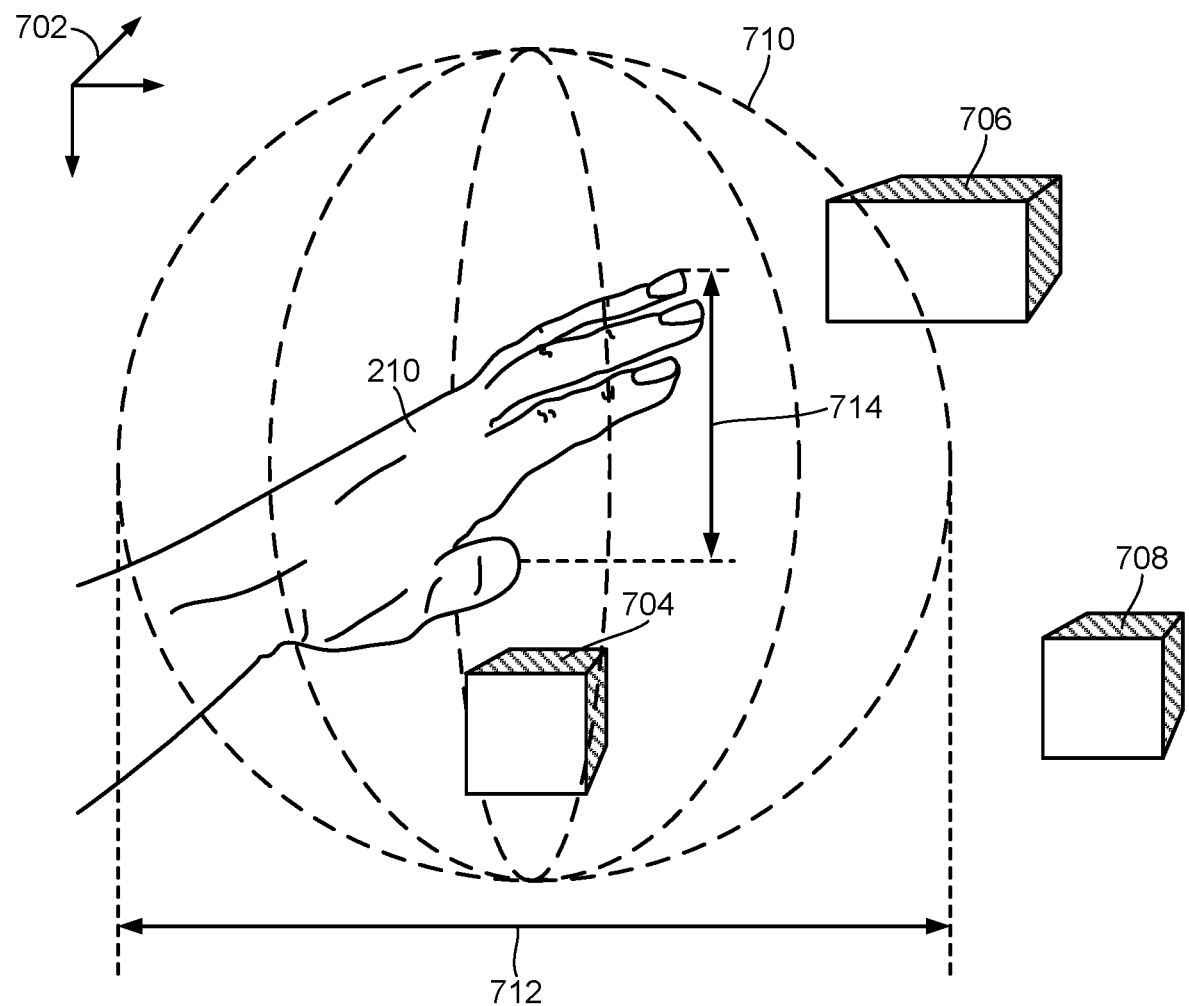
FIG. 7 illustrates an example implementation of determining a spatial relationship between a user and a physical object based on a first hand gesture according to one or more implementations of the technology described herein.

For example, FIG. 7 illustrates an implementation of determining a spatial relationship between a user and a physical object based on a first hand gesture according to one or more implementations of the technology described herein. The hand 210, of FIG. 7, is an open hand gesture, where hand 210 is open with fingers spread. In response to recognizing the open hand gesture, HMD 100 may generate a spatial area that is a closed 3D shape within the 3D point cloud defined by a coordinate system 702. As used herein a closed 3D shape is any 3D shape bounded on all sides. In the illustrated example of FIG. 7, the closed 3D shape is a sphere 710, but other closed 3D shapes, such as a cube, cuboid, pyramid, cone, prism, cylinder, and the like, may be implemented as well. Furthermore, the sphere 710 is coincident and oriented around the hand 210. In some aspects, a center of the sphere 710 is the center of hand 210. However, in other examples, the sphere 710 may be offset from the hand 210 (e.g., sphere 710 may be positioned such that a surface of sphere 710 is tangent to hand 210). Sphere 710 also includes a diameter 712. In some implementations, the diameter 712 is proportional to a spread 714 between the fingers of the hand 210. Thus, as the user 202 changes the spread 714 between their fingers, the diameter 712 may dynamically change correspondingly. That is, as the spread 714 increases, the diameter 712 may increase proportionally, and vice-a-versa.

FIG. 7 further illustrates several physical objects 704, 706, and 708 represented in the 3D point cloud. Physical object 704 is completely located within the sphere 710 and thus is included in the segmented image generated by VR engine 122. Physical object 706 is at least partially located within sphere 710 and thus is also included in the segmented image. However, no part of physical object 708 is located within the sphere 710 and thus may be excluded from the segmented image.

Figure 8:
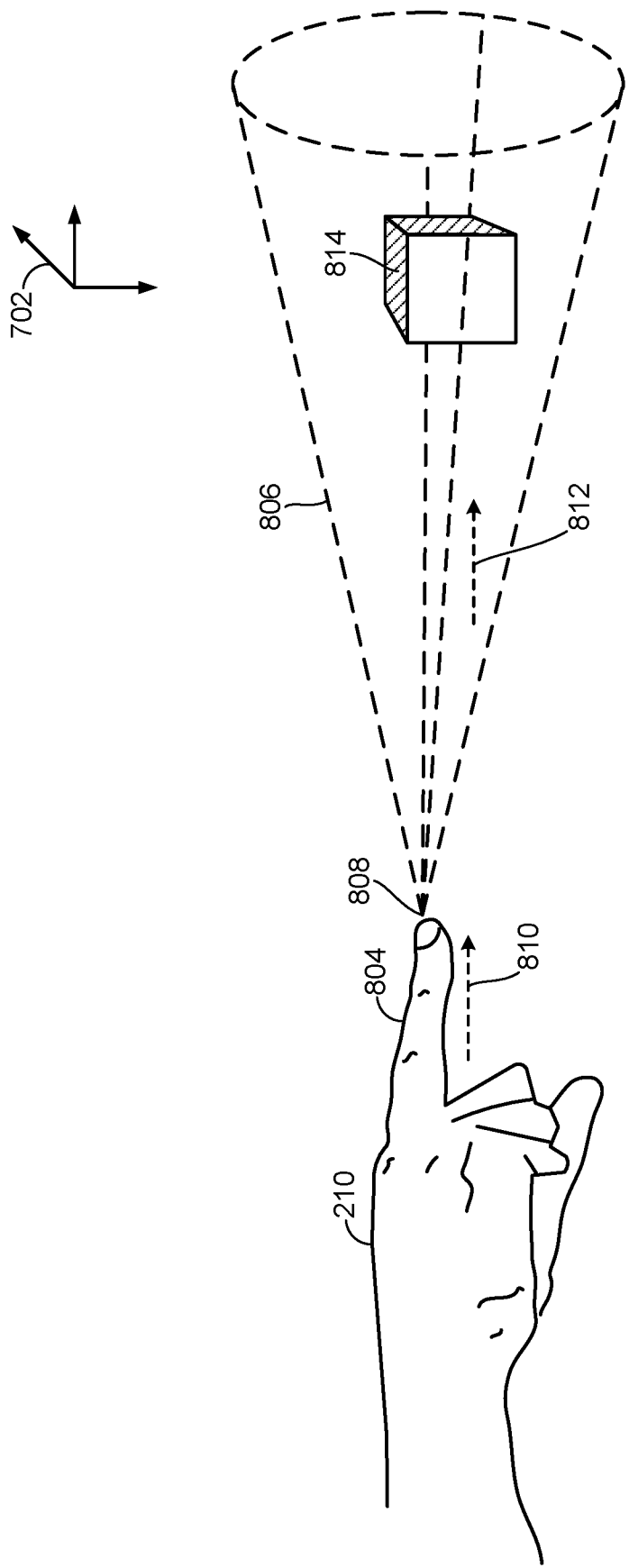
FIG. 8 illustrates an example implementation of determining a spatial relationship between a user and a physical object based on a second hand gesture according to one or more implementations of the technology described herein.

FIG. 8 illustrates an example implementation of determining a spatial relationship between a user and a physical object based on a second hand gesture according to one or more implementations of the technology described herein. In the example of FIG. 8 the hand 210 is a finger pointing gesture, where hand 210 includes at least one finger 804 extended. In response to recognizing the finger pointing gesture, HMD 100 may generate a spatial area that is an open spatial area within the 3D point cloud defined by a coordinate system 702. As used herein, an open spatial area may refer to a 2D or 3D shape that is not bounded on all sides. That is, at least one side of the open spatial area may be unbounded such that the open spatial area may dynamically extend into the point cloud. In the illustrated example of FIG. 8, the open spatial area is defined by a cone shape 806, but other open shapes, such as a cube, cuboid, pyramid, cone, prism, cylinder, and the like, may be implemented as well. Furthermore, the cone shape 806 extends into the 3D point cloud from the finger 804. Thus, cone shape 806 may include an apex 808 that is coincident at a tip of the finger 804. However, in other examples, the apex 808 may be offset from the tip of finger 804.

Cone shape 806 is also shown as extending away from finger 804 based on an orientation 810 of the finger 804 according to coordinate system 702. In some implementations, the orientation 812 of the cone shape 806 is the same or similar to the orientation 810 of finger 804. Thus, as the user 202 changes the orientation 810 of finger 804, the orientation 812 of the cone shape 806 may dynamically change correspondingly. That is, as the user points to an area within the physical environment 200, the orientation 812 of the cone shape 806 may change to encompass one or more physical objects located in that area. As shown in FIG. 8, physical object 814 is at least partially located within the cone shape 806 and thus is included in the segmented image.

Figure 9:
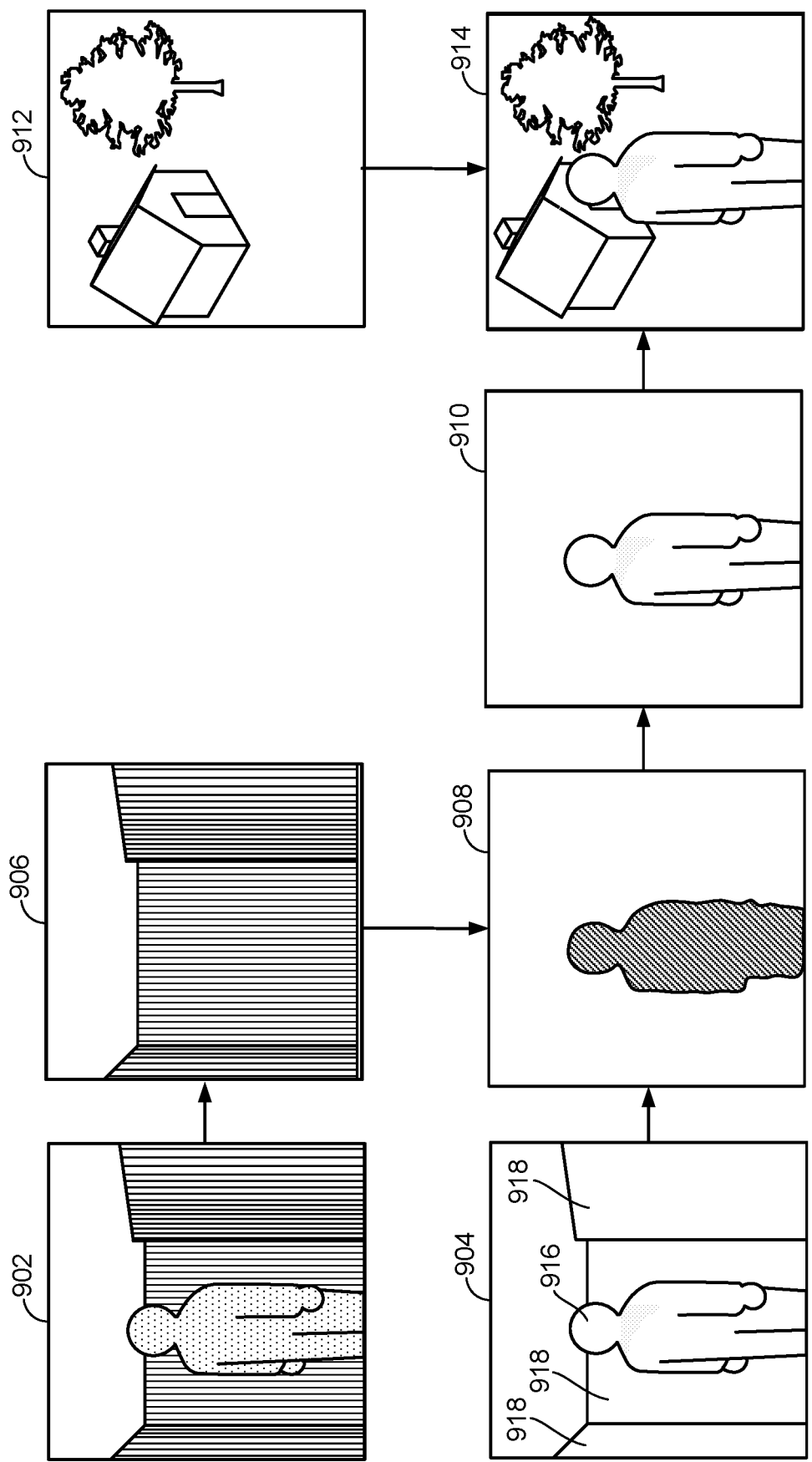
FIG. 9 illustrates a process of integrating a visual image of a physical object into a virtual image based on a past model of the physical environment according to one or more implementations of the technology described herein.

In some implementations, a user of the HMD 100 and/or HMD 204 may desire to sense when another person or object enters the physical environment or approaches within the vicinity of the user. Thus, certain aspects may include determining a spatial relationship between the user and the one or more physical objects by determining whether the one or more physical objects are new physical objects to the physical environment. For example, FIG. 9 illustrates a process of integrating a visual image of a physical object into a virtual image based on a past model of the physical environment according to one or more implementations of the technology described herein.

A depth image 902 of the physical environment 200 is captured by a depth camera 104 of HMD 204. FIG. 9 also illustrates a visual image 904 of the physical environment 200 that is captured by the visual camera 102. As shown, visual image 904 includes image data of a person 916 that has entered the physical environment 200 and walls 918. The VR engine 122 may be configured to transform the depth image 902 according to a position and orientation of the HMD 204 determined by, for example, sensor 104. The transformed depth image 902 is then combined with a past model (i.e., past depth image 906) in order to identify static objects as existing background object. For example, comparing the depth image 902 with past depth image 906 reveals that the walls 918 are all static objects and thus are classified as existing background objects, whereas person 916 is classified as a new background object.

The VR engine 122 may then segment the visual image 904 by comparing the depth image 902 with the past depth image 906 to generate a background delta mask 908. The VR engine 122 then applies the background delta mask 908 to the visual image 904 to generate a segmented image 910. As shown in FIG. 9, the segmented image 910 includes one or more new physical objects (i.e., person 916) captured by the visual camera 102.

The VR engine 122 then overlays the segmented image 910 onto a virtual image 912 to display a combined image 914 to the user 202 via display 126. Thus, the combined image 914 includes the virtual image 912 as well as the person 916 captured by the visual camera 102. In one aspect, the VR engine 122 may adjust the segmented image 910 according to virtual scene lighting to create an appearance of the person 916 that is more consistent with the virtual image 912 within the combined image 914. By way of example, VR engine 122 may be configured to adjust the segmented image 910 according to the virtual scene lighting when applying the background delta mask 908 to the visual image 904. That is, the VR engine 122 may generate a 3D mesh of the detected new physical object (e.g., person 916) based on a 3D point cloud, where portions of the visual image 904 corresponding to person 916 are then mapped onto the 3D mesh to generate the segmented image 910.

Figure 10:
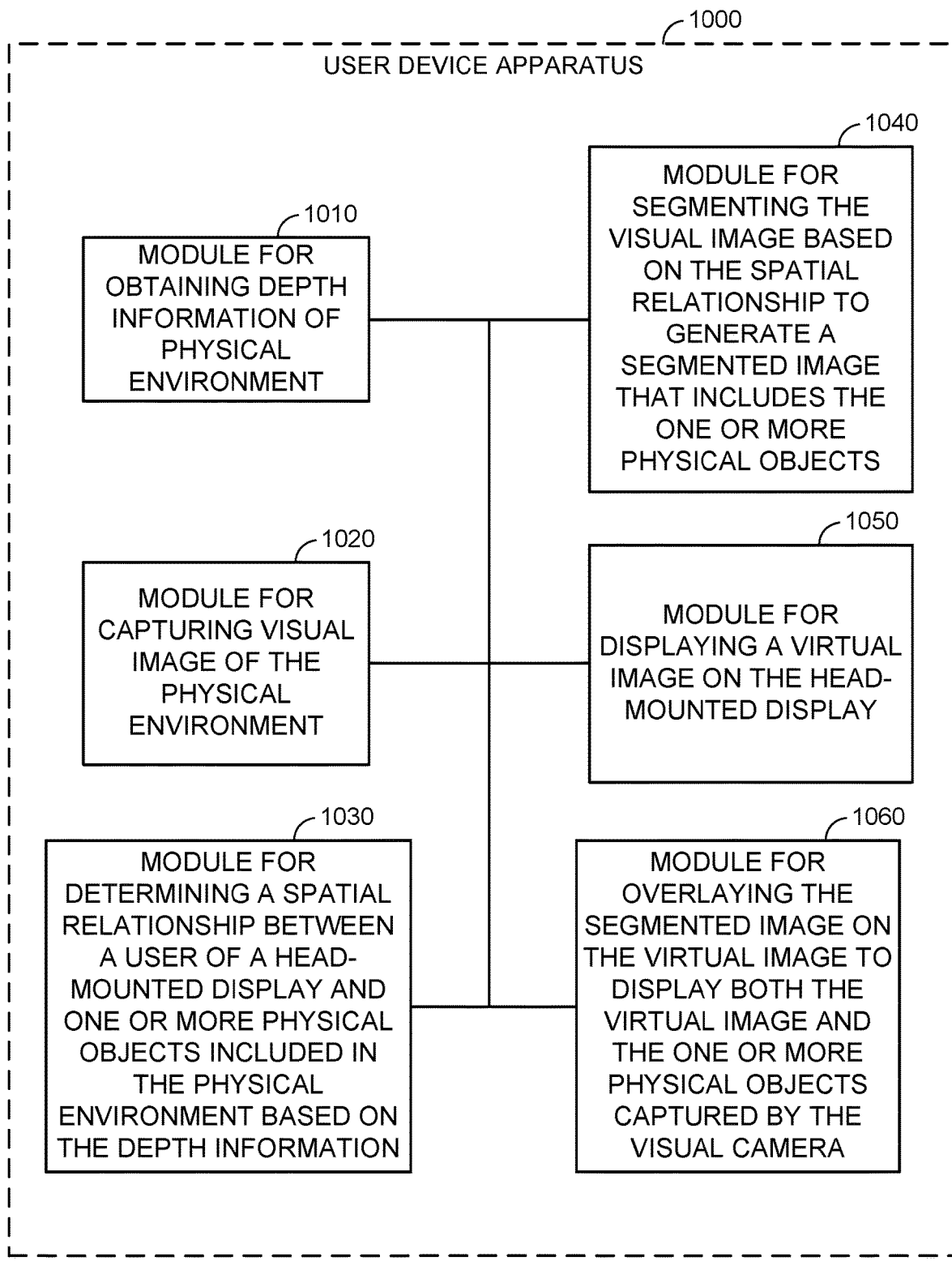
FIG. 10 is a simplified block diagram illustrating several sample aspects of components that may be employed in a user device configured to integrate visual images of a physical environment, as taught herein.

FIG. 10 is a simplified block diagram illustrating several sample aspects of components that may be employed in a user device apparatus 1000 configured to integrate visual images of a physical environment, as taught herein. User device apparatus 1000 is one possible implementation of HMD 100 of FIG. 1, and/or HMD 204 of FIG. 2, represented as a series of interrelated functional modules.

A module 1010 for capturing depth information of a physical environment may correspond at least in some aspects to, for example, a depth camera 104 and/or visual camera 102 of FIG. 1. A module 1020 for capturing a visual image of the physical environment may correspond at least in some aspects to, for example, a visual camera 102 of FIG. 1. A module 1030 for determining a spatial relationship between a user of a head-mounted display and one or more physical objects included in the physical environment based on the depth information may correspond at in some aspects to, for example, VR engine 122 of FIG. 1. A module 1040 for segmenting the visual image based on the spatial relationship to generate a segmented image that includes the one or more physical objects may correspond at in some aspects to, for example, VR engine 122, of FIG. 1. A module 1050 for presenting a virtual image with a head-mounted display may correspond at in some aspects to, for example, VR engine 122 in combination with display 126, of FIG. 1. A module 1060 for overlaying the segmented image on the virtual image to present both the virtual image and the one or more physical objects captured by the visual camera may correspond at in some aspects to, for example, VR engine 122 in combination with head-mounted display 126, of FIG. 1.

The functionality of the modules 1010-1060 of FIG. 1 may be implemented in various ways consistent with the teachings herein. In some designs, the functionality of these modules 1010-1060 may be implemented as one or more electrical components. In some designs, the functionality of these modules 1010-1060 may be implemented as a processing system including one or more processor components. In some designs, the functionality of these modules 1010-1060 may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIG. 10, as well as other components and functions described herein, may be implemented using any suitable means. Such means also may be implemented, at least in part, using corresponding structure as taught herein. For example, the components described above in conjunction with the "module for" components of FIG. 10 also may correspond to similarly designated "means for" functionality. Thus, in some aspects, one or more of such means may be implemented using one or more of processor components, integrated circuits, or other suitable structure as taught herein.

One or more implementations are described herein with reference to illustrations for particular applications. It should be understood that the implementations are not intended to be limiting. Those skilled in the art with access to the teachings provided herein will recognize additional modifications, applications, and implementations within the scope thereof and additional fields in which the technology would be of significant utility. In the above description of example implementations, for purposes of explanation, specific numbers, materials, configurations, and other details are set forth in order to better explain implementations as claimed. However, it will be apparent to one skilled in the art that the claims may be practiced using details different than the examples described herein. In other instances, well-known features are omitted or simplified to clarify the description of the example implementations.

What is claimed is:

1. A method for use with a head-mounted display in a physical environment, the method comprising:
    obtaining depth information of the physical environment, the physical environment including one or more physical objects, wherein the depth information includes a 3-dimensional (3D) point cloud of the physical environment;
    capturing a visual image of the physical environment with a visual camera;
    determining a spatial relationship between a user of the head-mounted display and the one or more physical objects included in the physical environment based on the depth information;
    segmenting the visual image based on the spatial relationship to generate a segmented image that includes the one or more physical objects, wherein segmenting the visual image includes:
        generating a 3D mesh of the one or more physical objects based on the 3D point cloud; and
        mapping a portion of the visual image onto the 3D mesh;
    displaying a virtual image on the head-mounted display; and
    overlaying the segmented image on the virtual image to display both the virtual image and the one or more physical objects captured by the visual camera.

2. The method of claim 1, wherein determining the spatial relationship between the user of the head-mounted display and the one or more physical objects includes determining a distance between the user and the one or more physical objects, wherein segmenting the visual image comprises including the one or more physical objects in the segmented image if the distance is less than a threshold.

3. The method of claim 2, wherein a value of the threshold is such that the segmented image includes the one or more physical objects if the user is touching the one or more physical objects.

4. The method of claim 3, wherein the value of the threshold is such that the segmented image includes the one or more physical objects if the user is at least near the one or more physical objects.

5. The method of claim 2, wherein the distance between the user and the one or more physical objects is a distance between a hand of the user and the one or more physical objects.

6. The method of claim 1, wherein overlaying the segmented image on the virtual image comprises adjusting a transparency of the one or more physical objects captured by the visual camera based on the distance between the user and the one or more physical objects, wherein adjusting the transparency of the one or more physical objects comprises increasing or decreasing the transparency proportional to the increase or decrease in the distance between the user and the one or more physical objects.

7. The method of claim 6, wherein overlaying the segmented image on the virtual image comprises adjusting the transparency of the one or more physical objects captured by the visual camera such that the virtual image is not fully occluded by the one or more physical objects.

8. The method of claim 7, further comprising increasing the transparency of the one or more physical objects in the virtual image over a period of time until the one or more physical objects are fully transparent.

9. The method of claim 1, wherein determining the spatial relationship between the user of the head-mounted display and the one or more physical objects comprises recognizing a hand gesture of a hand of the user to identify the one or more physical objects to include in the segmented image.

10. The method of claim 9, further comprising:
    generating a spatial area within the 3D point cloud and in proximity to a hand of the user in response to recognizing the hand gesture, and wherein segmenting the visual image comprises including the one or more physical objects in the segmented image if the one or more physical objects are located at least partially within the spatial area.

11. The method of claim 10, wherein generating the spatial area comprises generating a closed 3D shape in response to recognizing the hand gesture, and wherein segmenting the visual image comprises including the one or more physical objects in the segmented image if the one or more physical objects are located at least partially within the closed 3D shape.

12. The method of claim 11, wherein the hand gesture is an open hand gesture, and wherein the closed 3D shape is a sphere.

13. The method of claim 12, wherein the sphere is oriented around the hand of the user and has a diameter proportional to a spread of fingers of the hand of the user.

14. The method of claim 10, wherein generating the spatial area comprises generating an open spatial area extending into the 3D point cloud from the hand of the user in response to recognizing the hand gesture, and wherein segmenting the visual image comprises including the one or more physical objects in the segmented image if the one or more physical objects are located at least partially within the open spatial area.

15. The method of claim 14, wherein the hand gesture is a finger pointing hand gesture, wherein the open spatial area is an area defined by a cone shape having an apex at a finger of the hand of the user, and wherein the cone shape extends away from the finger into the physical environment based on an orientation of the finger.

16. The method of claim 1, wherein segmenting the visual image based on the spatial relationship to generate a segmented image comprises adjusting the segmented image according to virtual scene lighting of the virtual image.

17. The method of claim 1, wherein segmenting the visual image comprises segmenting the one or more physical objects from one or more other physical objects included in the physical environment based on the depth information.

18. The method of claim 1, wherein segmenting the visual image comprises generating the segmented image to include the one or more physical objects and a hand of the user captured by the visual camera.

19. The method of claim 1, wherein a field of view of the physical environment captured by the visual camera is a field of view of the user that is obstructed by the head-mounted display.

20. The method of claim 1, wherein determining the spatial relationship between the user of the head-mounted display and the one or more physical objects comprises:
    obtaining a past model of the physical environment; and
    determining whether the one or more physical objects are new physical objects to the physical environment based on the past model, wherein segmenting the visual image comprises including the one or more physical objects in the segmented image in response to determining that the one or more physical objects are new physical objects to the physical environment.

21. A head-mounted display, comprising:
    means for obtaining depth information of a physical environment, the physical environment including one or more physical objects and a hand of a user, wherein the depth information includes a 3-dimensional (3D) point cloud of the physical environment;
    a visual camera for capturing a visual image of the physical environment;
    means for determining a spatial relationship between a user of the head-mounted display and the one or more physical objects included in the physical environment based on the depth information;
    means for segmenting the visual image based on the spatial relationship to generate a segmented image that includes the one or more physical objects, wherein the means for segmenting the visual image includes:
        means for generating a 3D mesh of the one or more physical objects based on the 3D point cloud; and
        means for mapping a portion of the visual image onto the 3D mesh;
    means for displaying a virtual image on the head-mounted display; and
    means for overlaying the segmented image on the virtual image to display both the virtual image and the one or more physical objects captured by the visual camera.

22. The head-mounted display of claim 21, wherein determining the spatial relationship between the user of the head-mounted display and the one or more physical objects includes determining a distance between the user and the one or more physical objects, wherein the means for segmenting the visual image comprises means for including the one or more physical objects in the segmented image if the distance is less than a threshold.

23. The head-mounted display of claim 22, wherein the distance between the user and the one or more physical objects is a distance between a hand of the user and the one or more physical objects.

24. The head-mounted display of claim 23, wherein the means for determining the spatial relationship between the user of the head-mounted display and the one or more physical objects comprises means for recognizing a hand gesture of the hand of the user to identify the one or more physical objects to include in the segmented image.

25. The head-mounted display of claim 24, further comprising:
    means for generating a spatial area within the 3D point cloud and in proximity to the hand of the user in response to recognizing the hand gesture, and wherein the means for segmenting the visual image comprises means for including the one or more physical objects in the segmented image if the one or more physical objects are located at least partially within the spatial area.

26. The head-mounted display of claim 25, wherein the means for generating the spatial area comprises means for generating a closed 3D shape in response to recognizing the hand gesture, and wherein the means for segmenting the visual image comprises means for including the one or more physical objects in the segmented image if the one or more physical objects are located at least partially within the closed 3D shape.

27. The head-mounted display of claim 25, wherein the means for generating the spatial area comprises means for generating an open spatial area extending into the 3D point cloud from the hand of the user in response to recognizing the hand gesture, and wherein the means for segmenting the visual image comprises means for including the one or more physical objects in the segmented image if the one or more physical objects are located at least partially within the open spatial area.

28. The head-mounted display of claim 21, wherein the means for determining the spatial relationship between the user of the head-mounted display and the one or more physical objects comprises:
    means for obtaining a past model of the physical environment; and
    means for determining whether the one or more physical objects are new physical objects to the physical environment based on the past model, wherein the means for segmenting the visual image comprises means for including the one or more physical objects in the segmented image in response to determining that the one or more physical objects are new physical objects to the physical environment.

29. A head-mounted display comprising:
    a visual camera;
    a display;
    at least one processor; and at least one memory coupled to the at least one processor, the at least one processor configured to direct the head-mounted display to:
- obtain depth information of a physical environment, the physical environment including one or more physical objects, wherein in the depth information includes a 3-dimensional (3D) point cloud of the physical environment;
- capture a visual image of the physical environment with the visual camera;
- determine a spatial relationship between a user of the head-mounted display and the one or more physical objects included in the physical environment based on the depth information;
- segment the visual image based on the spatial relationship to generate a segmented image that includes the one or more physical objects, wherein segmenting the visual image includes:
  - generating a 3D mesh of the one or more physical objects based on the 3D point cloud; and
  - mapping a portion of the visual image onto the 3D mesh;
- display a virtual image on the display; and
- overlay the segmented image on the virtual image to display both the virtual image and the one or more physical objects captured by the visual camera.

30. The head-mounted display of claim 29, wherein the at least one processor is further configured to direct the head-mounted display to:
- determine a distance between the user and the one or more physical objects; and
- segment the visual image by including the one or more physical objects in the segmented image if the distance is less than a threshold.

31. The head-mounted display of claim 30, wherein the distance between the user and the one or more physical objects is a distance between a hand of the user and the one or more physical objects.

32. The head-mounted display of claim 31, wherein the at least one processor is further configured to direct the head-mounted display to:
- determine the spatial relationship between the user of the head-mounted display and the one or more physical objects by recognizing a hand gesture of the hand of the user to identify the one or more physical objects to include in the segmented image.

33. The head-mounted display of claim 32, wherein the at least one processor is further configured to direct the head-mounted display to:
- generate a spatial area within the 3D point cloud and in proximity to the hand of the user in response to recognizing the hand gesture;
- segment the visual image by including the one or more physical objects in the segmented image if the one or more physical objects are located at least partially within the spatial area.

34. The head-mounted display of claim 33, wherein the at least one processor is further configured to direct the head-mounted display to:
- generate the spatial area by generating a closed 3D shape in response to recognizing the hand gesture; and
- segment the visual image by including the one or more physical objects in the segmented image if the one or more physical objects are located at least partially within the closed 3D shape.

35. The head-mounted display of claim 33, wherein the at least one processor is further configured to direct the head-mounted display to:
- generate the spatial area by generating an open spatial area extending into the 3D point cloud from the hand of the user in response to recognizing the hand gesture;
- segment the visual image by including the one or more physical objects in the segmented image if the one or more physical objects are located at least partially within the open spatial area.

36. The head-mounted display of claim 29, wherein the at least one processor is further configured to direct the head-mounted display to determine the spatial relationship between the user of the head-mounted display and the one or more physical objects by:
- obtaining a past model of the physical environment;
- determining whether the one or more physical objects are new physical objects to the physical environment based on the past model; and
- segmenting the visual image by including the one or more physical objects in the segmented image in response to determining that the one or more physical objects are new physical objects to the physical environment.

37. The head-mounted display of claim 29, further comprising a depth camera, wherein the at least one processor is further configured to direct the head-mounted display to capture the depth information of the physical environment with the depth camera.

38. A non-transitory computer-readable medium including program code stored thereon, the program code comprising instructions which when executed cause a head-mounted display to:
- obtain depth information of a physical environment, the physical environment including one or more physical objects, wherein the depth information includes a 3-dimensional (3D) point cloud of the physical environment;
- capture a visual image of the physical environment with a visual camera;
- determine a spatial relationship between the user of the head-mounted display and the one or more physical objects included in the physical environment based on the depth information;
- segment the visual image based on the spatial relationship to generate a segmented image that includes the one or more physical objects, wherein segmenting the visual image includes:
  - generating a 3D mesh of the one or more physical objects based on the 3D point cloud; and
  - mapping a portion of the visual image onto the 3D mesh;
- display a virtual image on the head-mounted display; and
- overlay the segmented image on the virtual image to display both the virtual image and the one or more physical objects captured by the visual camera.

39. The non-transitory computer-readable medium of claim 38, wherein the non-transitory computer-readable medium further comprises instructions to direct the head-mounted display to:
- determine a distance between the user and the one or more physical objects, wherein the instructions to the visual image comprises instructions to include the one or more physical objects in the segmented image only if the distance is less than a threshold.

40. The non-transitory computer-readable medium of claim 38, wherein the instructions to determine the spatial relationship between the user of the head-mounted display and the one or more physical objects comprises instruction to recognize a hand gesture of a hand of the user to identify the one or more physical objects to include in the segmented image.

41. The non-transitory computer-readable medium of claim 40, wherein the non-transitory computer-readable medium further comprises instructions to direct the head-mounted display to:
  generate a spatial area within the 3D point cloud and in proximity to the hand of the user in response to recognizing the hand gesture; and
  segment the visual image by including the one or more physical objects in the segmented image if the one or more physical objects are located at least partially within the spatial area.

42. The non-transitory computer-readable medium of claim 41, wherein the instructions to generate the spatial area comprises instructions to generate a closed 3D shape in response to recognizing the hand gesture, and wherein the instructions to segment the visual image comprises instructions to include the one or more physical objects in the segmented image if the one or more physical objects are located at least partially within the closed 3D shape.

43. The non-transitory computer-readable medium of claim 41, wherein the instructions to generate the spatial area comprises instructions to generate an open spatial area extending into the 3D point cloud from the hand of the user in response to recognizing the hand gesture, and wherein the instructions to segment the visual image comprises instructions to include the one or more physical objects in the segmented image if the one or more physical objects are located at least partially within the open spatial area.

44. The non-transitory computer-readable medium of claim 38, wherein the instructions to determine the spatial relationship between the user of the head-mounted display and the one or more physical objects comprises instructions to direct the head-mounted display to:
  obtain a past model of the physical environment;
  determine whether the one or more physical objects are new physical objects to the physical environment based on the past model; and
  segment the visual image by including the one or more physical objects in the segmented image in response to determining that the one or more physical objects are new physical objects to the physical environment.

* * * * *